US008199958B2

(12) United States Patent
Weir et al.

(10) Patent No.: US 8,199,958 B2
(45) Date of Patent: Jun. 12, 2012

(54) BATTERY CHARGING JOBSITE AUDIO APPARATUS

(75) Inventors: Alan Weir, Lake Zurich, IL (US); John DeCicco, Elmhurst, IL (US); Andrew Cho, Naperville, IL (US); Steven W. Cole, Jr., Lombard, IL (US); Amy Smith, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 392 days.

(21) Appl. No.: 12/436,956

(22) Filed: May 7, 2009

(65) Prior Publication Data
US 2009/0290745 A1    Nov. 26, 2009

Related U.S. Application Data

(60) Provisional application No. 61/128,572, filed on May 22, 2008.

(51) Int. Cl.
*H04R 1/02* (2006.01)
*H04R 9/06* (2006.01)

(52) U.S. Cl. .......... 381/387; 381/87; 381/332; 381/333; 381/345; 381/386; 381/388; 381/395

(58) Field of Classification Search ................... 381/87, 381/332, 333, 345, 386, 387, 388, 395
See application file for complete search history.

(56) References Cited

U.S. PATENT DOCUMENTS

| | | | |
|---|---|---|---|
| 2,070,088 A | 2/1937 | Montaruli | |
| 2,455,716 A | 12/1948 | Weiss | |
| 4,249,037 A | 2/1981 | Dexter | |
| 4,700,395 A * | 10/1987 | Long | 381/334 |
| 5,502,772 A * | 3/1996 | Felder | 381/386 |
| D461,469 S * | 8/2002 | Wang et al. | D14/497 |
| D479,223 S * | 9/2003 | Furusho et al. | D14/196 |
| D505,942 S * | 6/2005 | Meyer et al. | D14/215 |
| 6,982,541 B2 | 1/2006 | Zick et al. | |
| 7,334,791 B2 * | 2/2008 | Lindsey et al. | 273/146 |
| D572,235 S * | 7/2008 | Imawaki | D14/207 |
| D574,362 S * | 8/2008 | Zhong | D14/214 |
| 7,469,052 B2 * | 12/2008 | Peavey | 381/334 |
| D585,049 S * | 1/2009 | Koroma | D14/168 |
| 7,657,050 B2 * | 2/2010 | Warren et al. | 381/333 |
| 7,804,966 B2 * | 9/2010 | Adams et al. | 381/87 |
| 7,835,534 B2 * | 11/2010 | Cole et al. | 381/189 |
| 8,036,409 B2 * | 10/2011 | Hisamoto et al. | 381/345 |
| 2005/0078834 A1 * | 4/2005 | Hirschburger et al. | 381/58 |
| 2005/0130583 A1 * | 6/2005 | Troutman | 455/3.02 |

(Continued)

FOREIGN PATENT DOCUMENTS

EP            1471766         10/2004

(Continued)

*Primary Examiner* — Ida M Soward
(74) *Attorney, Agent, or Firm* — Greer, Burns & Crain, Ltd.

(57) ABSTRACT

Embodiments of the present invention comprise a battery charging jobsite audio unit that is particularly useful at construction and other jobsites are disclosed which provides important desirable features and functionality comprise a housing, at least one charger for charging a removable battery pack, an audio unit that includes a speaker system for providing substantially 360° sound, as well as subwoofer, a cord and plug for connecting the unit to a source of AC power, and circuitry for selectively applying power to the audio unit and the charger. The preferred and alternative embodiments also preferably have a unique protective frame structure that is connected to the housing of the unit.

23 Claims, 9 Drawing Sheets

U.S. PATENT DOCUMENTS

| | | |
|---|---|---|
| 2005/0225288 A1 | 10/2005 | Cole, Jr. et al. |
| 2006/0269069 A1 | 11/2006 | Polk, Jr. |
| 2007/0024237 A1 | 2/2007 | Cole, Jr. et al. |
| 2008/0012527 A1 | 1/2008 | Zick et al. |
| 2009/0021654 A1 * | 1/2009 | Jones .......................... 348/838 |
| 2010/0180756 A1 * | 7/2010 | Fliegler et al. ................. 84/723 |

FOREIGN PATENT DOCUMENTS

JP  2003-274479  9/2003

* cited by examiner

BATTERY CHARGING JOBSITE AUDIO APPARATUS

BACKGROUND OF THE INVENTION

This invention generally relates to portable audio equipment that is particularly useful at construction and other jobsites.

Many construction and other workers frequently have to work at jobsites that are remotely located. Workers often bring radios and other audio equipment to the jobsite because they prefer to work in an environment where they can listen to music, sports, talk shows and the like. Many workers merely bring portable radios that can also be plugged into an AC source, or ones that are configured to be powered by batteries or an AC source. If the radios are relatively small or are powered by small batteries, the sound quality produced may be relatively poor and have a less than full, desirable frequency range. Such smaller radios may have stereo speakers, that are typically located a short distance apart from one another on opposite sides of a control panel that effectively direct sound in a single direction. Because the work that is going on at many jobsites produces an ambient noise environment that is often high if not extremely noisy, the workers may want to turn up the volume of the radio to a level that will deplete the battery power in a short time.

Cordless power tools are frequently used at jobsites, whether convenient sources of power are readily available or not. These battery operated tools provide a portability and convenience advantages over corded tools, but the battery packs that power them become depleted and need to be recharged. While some workers bring a sufficient number of battery packs to last a complete day, there is generally at least temporary electrical service provided which may enable battery packs to be recharged on the jobsite.

It is well known that construction sites present a tough environment for such audio equipment which is prone to being damaged. These and other considerations demonstrate that a need exists for improved jobsite equipment.

SUMMARY OF THE INVENTION

Embodiments of the present invention comprise a battery charging jobsite audio unit that is particularly useful at construction and other jobsites are disclosed which provides important desirable features and functionality comprise a housing, at least one charger for charging a removable battery pack, an audio unit that includes a speaker system for providing substantially 360° sound, as well as subwoofer, a cord and plug for connecting the unit to a source of AC power, and circuitry for selectively applying power to the audio unit and the charger. The preferred and alternative embodiments also preferably have a unique protective frame structure that is connected to the housing of the unit.

DETAILED DESCRIPTION OF THE PREFERRED EMBODIMENTS

Figure 1:
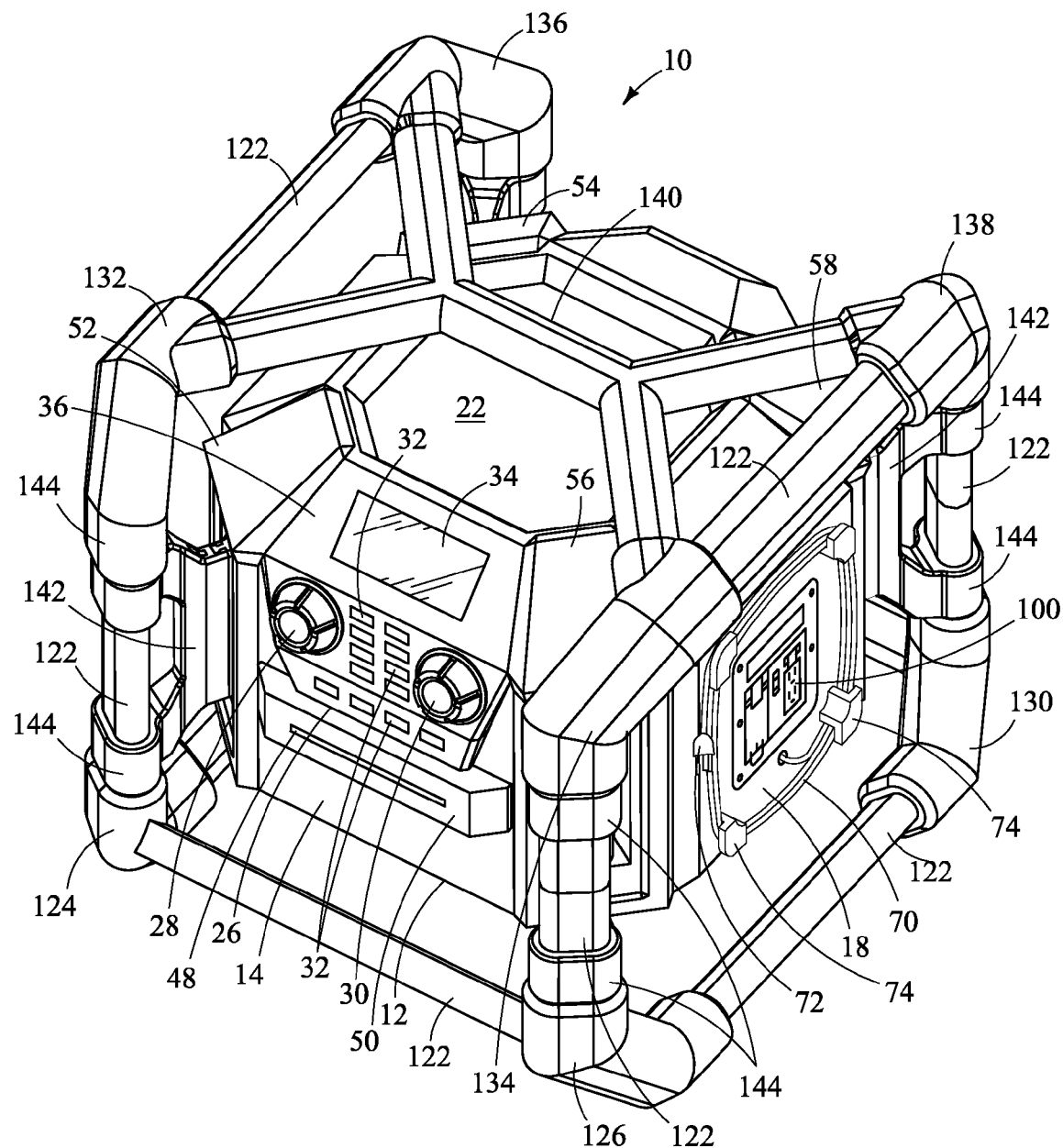
FIG. 1 is a perspective view of the preferred embodiment of the present invention taken from an elevated front right perspective.

A preferred embodiment of the battery charging jobsite audio unit is shown in the drawings and is indicated generally at 10, which has a housing, indicated generally at 12, that includes a front face or wall 14, a left side face or wall 16, a right side face or wall 18, a rear wall 20, a top surface 22, and a bottom surface 24. The housing 12 is preferably made of a tough plastic or other molded material, and may be comprised of a few or several parts that structurally fit together in a rugged strong unit. For example, the front and back walls 14 and 20 may be generally flat unitary pieces which are connected together to one or more molded or otherwise formed front, top, bottom and rear walls that may be formed as one, two, or more components that are connected together.

Figure 2:
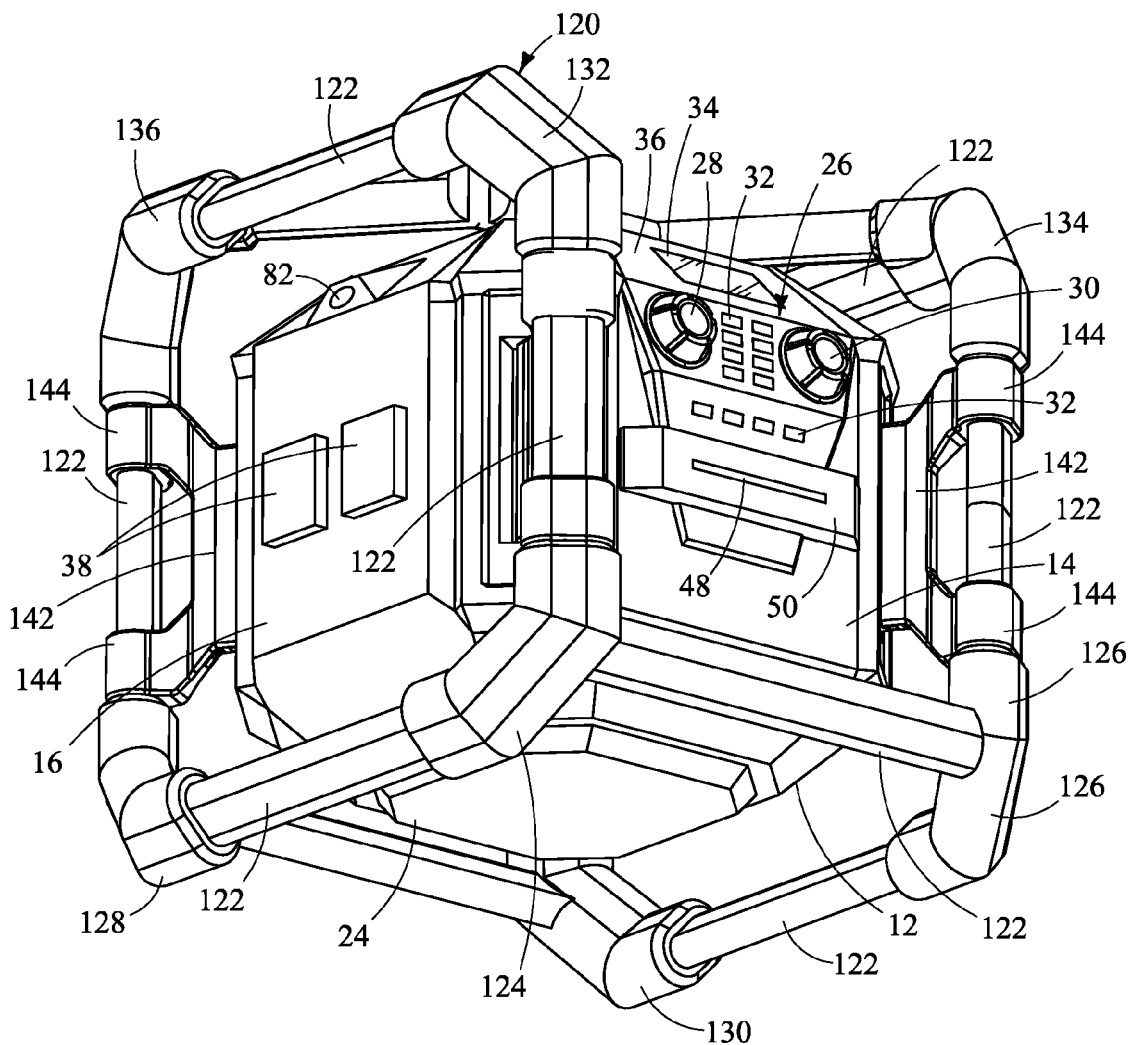
FIG. 2 is another perspective view of the embodiment shown in FIG. 1 taken from a lower front left perspective.

The preferred embodiment has an audio unit, indicated generally at 26, which is located in the front face 14 of the unit. As best shown in FIGS. 1 and 2, the audio unit 26 preferably comprises an audio unit that includes an AM/FM radio and a CD/DVD player. The audio unit 26 also has the capability of including or connecting additional sources such as a MP3 player, a USB thumb drive or USB connection to an external MP3 player or a memory card such as a SD memory card or a compact flash card. Moreover, embodiments of the audio unit 26 have the ability to be connected to a remote set of speakers via a wireless transmission such as Bluetooth or 900 megahertz-2.4 gigahertz communication links. A Bluetooth transmission system may also be used to transmit audio from external devices to the audio unit. 26.

The audio unit 26 has a on/off and volume control knob 28, a radio tuning knob 30, a number of pushbuttons 32 located between the knobs 28 and 30 as well as below them. The pushbuttons are for controlling operations of the various types of sources as described above and operational capability and status is shown on a preferably LCD display screen 34 that is located on an angled face portion 36. The audio unit 26 is integrated into the housing and wired so that other audio sources can be plugged into one or more receptacles such as is shown at 38 in the left face 16. In this regard, the receptacles 38 may be configured to provide a docking structure for receiving a satellite radio, an IPOD housing, Bluetooth modules, MP3 players, and the like. While two of such receptacles are shown in the drawings, it should be understood that additional or fewer receptacles can be provided.

Figure 4:
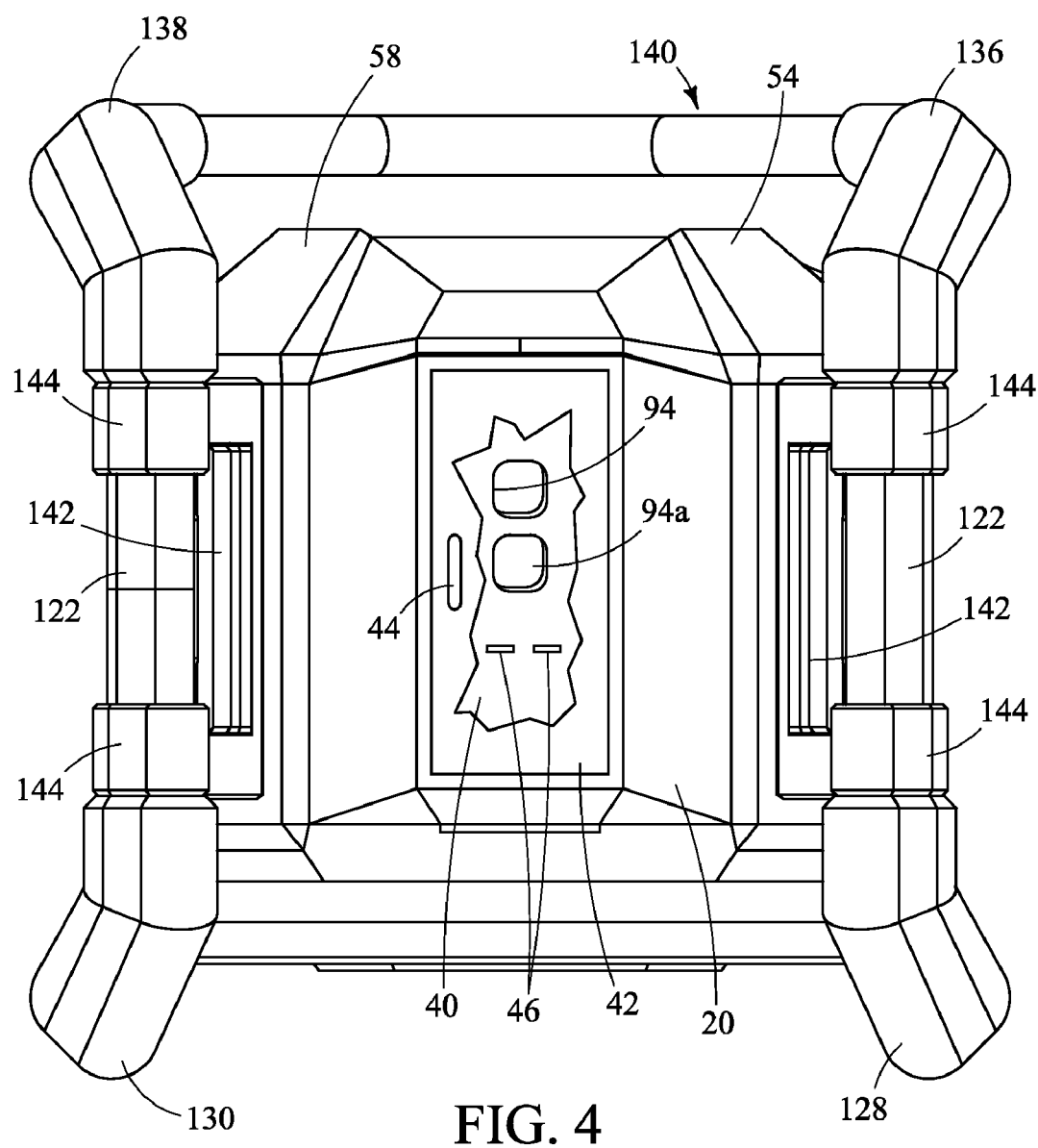
FIG. 4 is a rear plan view of the embodiment shown in FIG. 1 and shown with portions broken away to reveal inner detail.

The rear face 20 (see FIG. 4) has a compartment 40 which is covered by a hinged door 42 having a handle 44. The compartment 40 is thereby protected and is a preferred location for USB ports or other ports 46 for receiving the USB thumb drives or memory cards, for example. The unit 10 has an integrated CD/DVD player and the tray 48 is preferably located in the horizontal shelf 50.

The audio unit 26 has an internal amplifier to provide high volume playback from any of the above-described sources and does so through four speakers that are located at the four corners at the top of the housing 12. More particularly, speakers 52, 54, 56 and 58 are located respectively at the left front, left rear, right front and right rear corners of the housing, mounted to the housing at an angle so as to direct the sound outwardly and upwardly from the unit. Since the unit 10 will often be placed on the ground or floor, the sound can be directed in an omni-directional or full 360° range outwardly and upwardly of the unit.

The angle of the speakers is preferably in the range of 30°-45° relative to vertical and preferably at the lower end of that range. The speakers are diagrammatically shown in FIG. 9 but are located underneath the angled face at the top of each of the corners, which preferably comprises a speaker grill. The actual physical appearance of speakers 52-58 are not shown in FIGS. 1-8, but they are identified with the speaker reference numbers at their location for the sake of convenience, it being understood that the speakers are mounted in the housing immediately beneath the grill.

Figure 6:
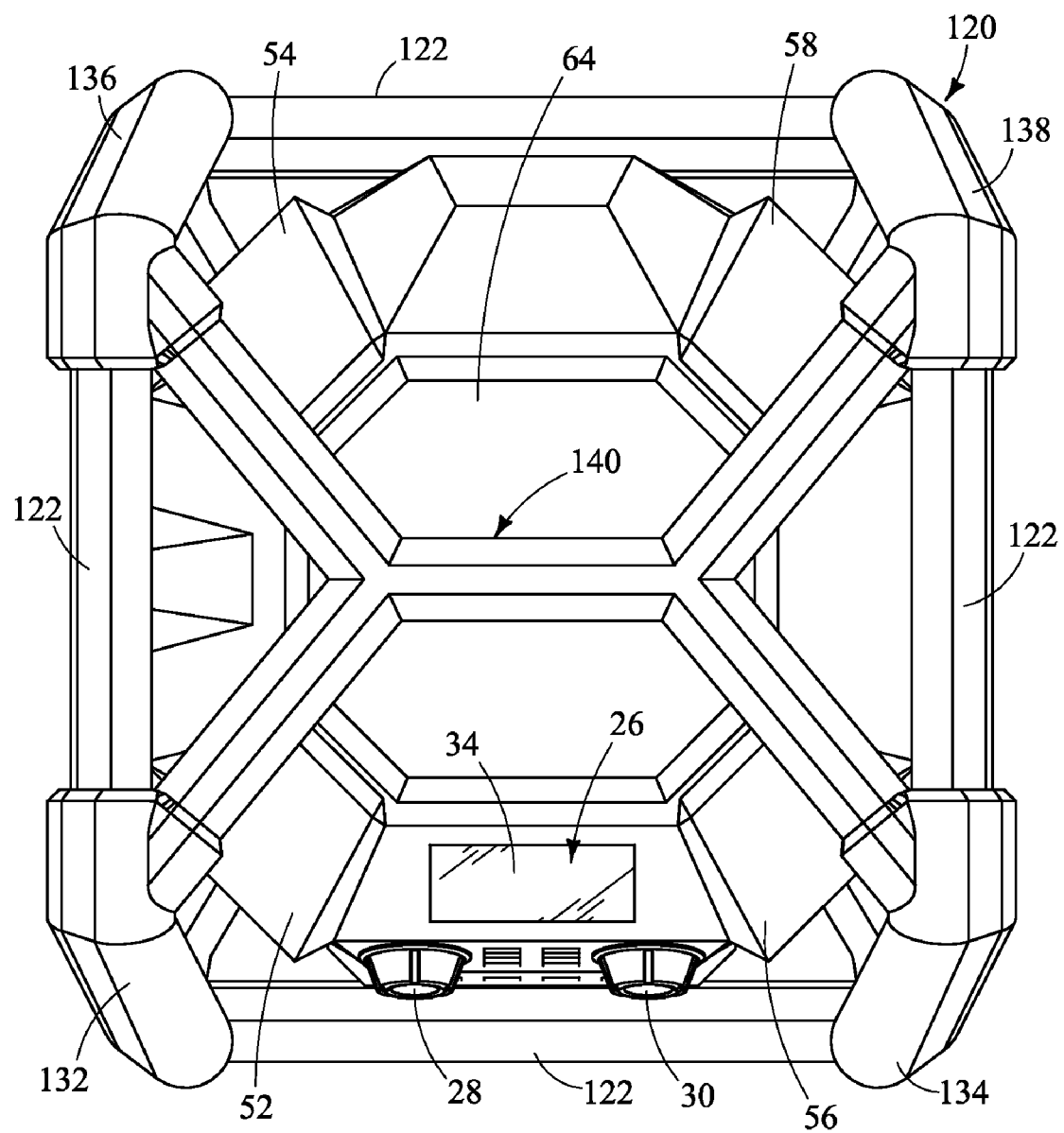
FIG. 6 is a top plan view of the embodiment shown in FIG. 1.

As is best shown in the top view of FIG. 6, the speakers are preferably configured to provide stereo playback and to this end, the speakers 52 and 58 are preferably "left" speakers and speakers 54 and 56 are preferably "right" speakers. This has been found to be the most effective way in which to provide stereo playback throughout the area the sound is broadcast.

Figure 5:
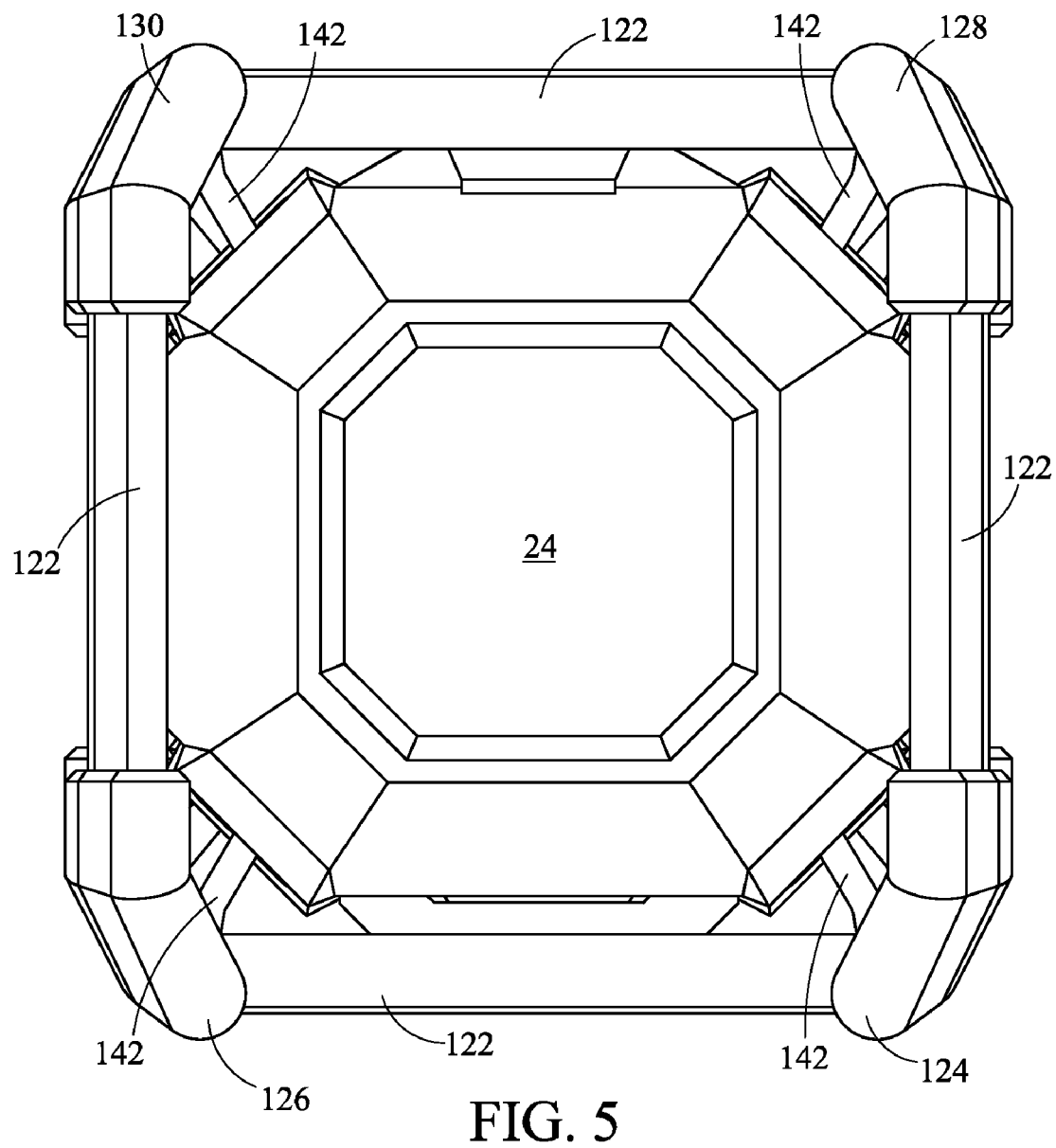
FIG. 5 is a bottom plan view of the embodiment shown in FIG. 1.
Figure 9:
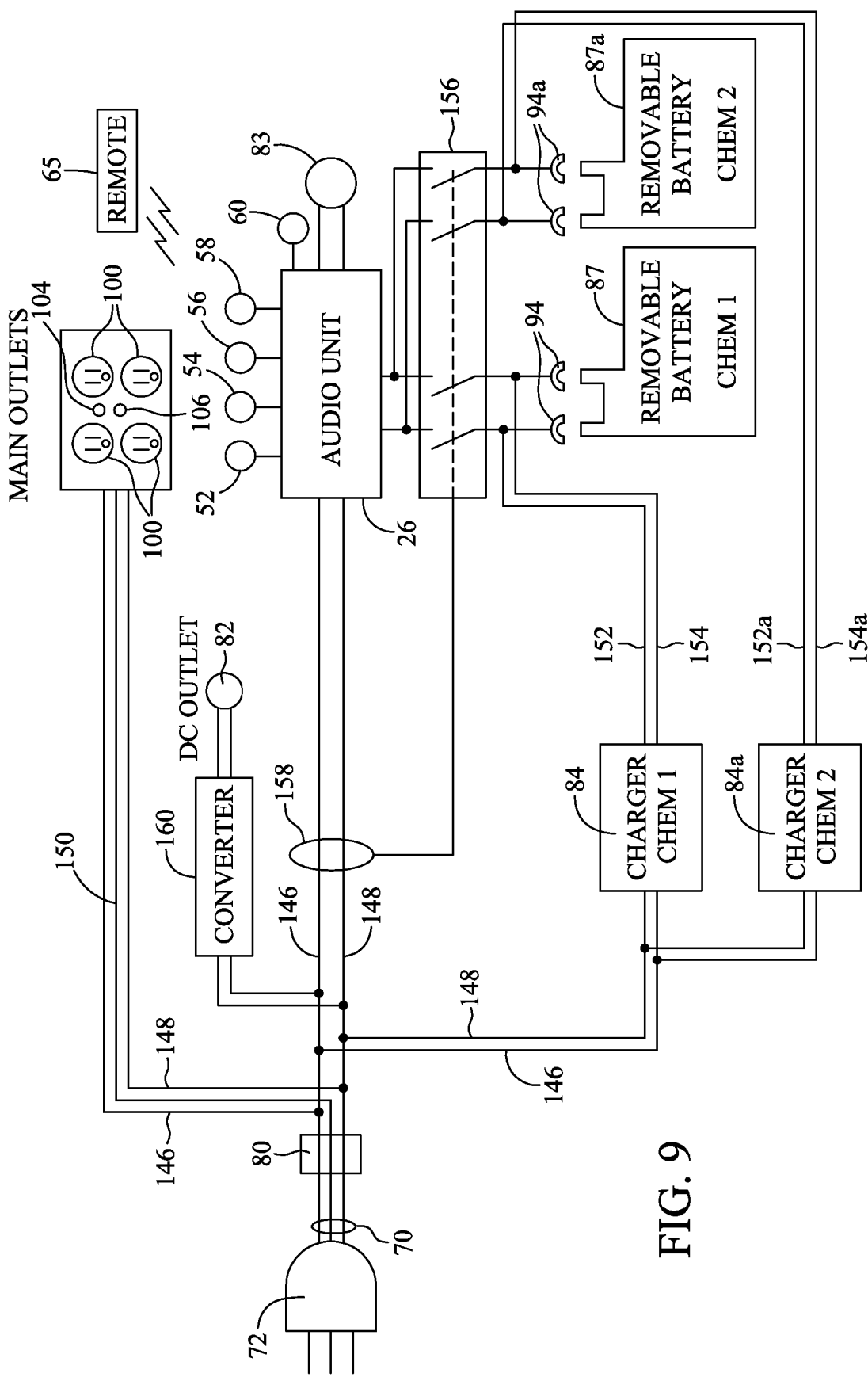
FIG. 9 is an electrical schematic diagram of the embodiment shown in FIG. 1.

Because it is desired to provide high quality playback from the audio sources, a subwoofer 60 is provided and is located in the bottom face 24 as shown in FIGS. 2, 5 and 9. As was the case for the other speakers, the actual subwoofer is not shown in FIG. 5 but is covered by a speaker grill. All of the speakers 52, 54, 56, 58 and 60 are preferably waterproof speakers because of the likelihood that the unit will at least occasionally be exposed to the elements.

Figure 3:
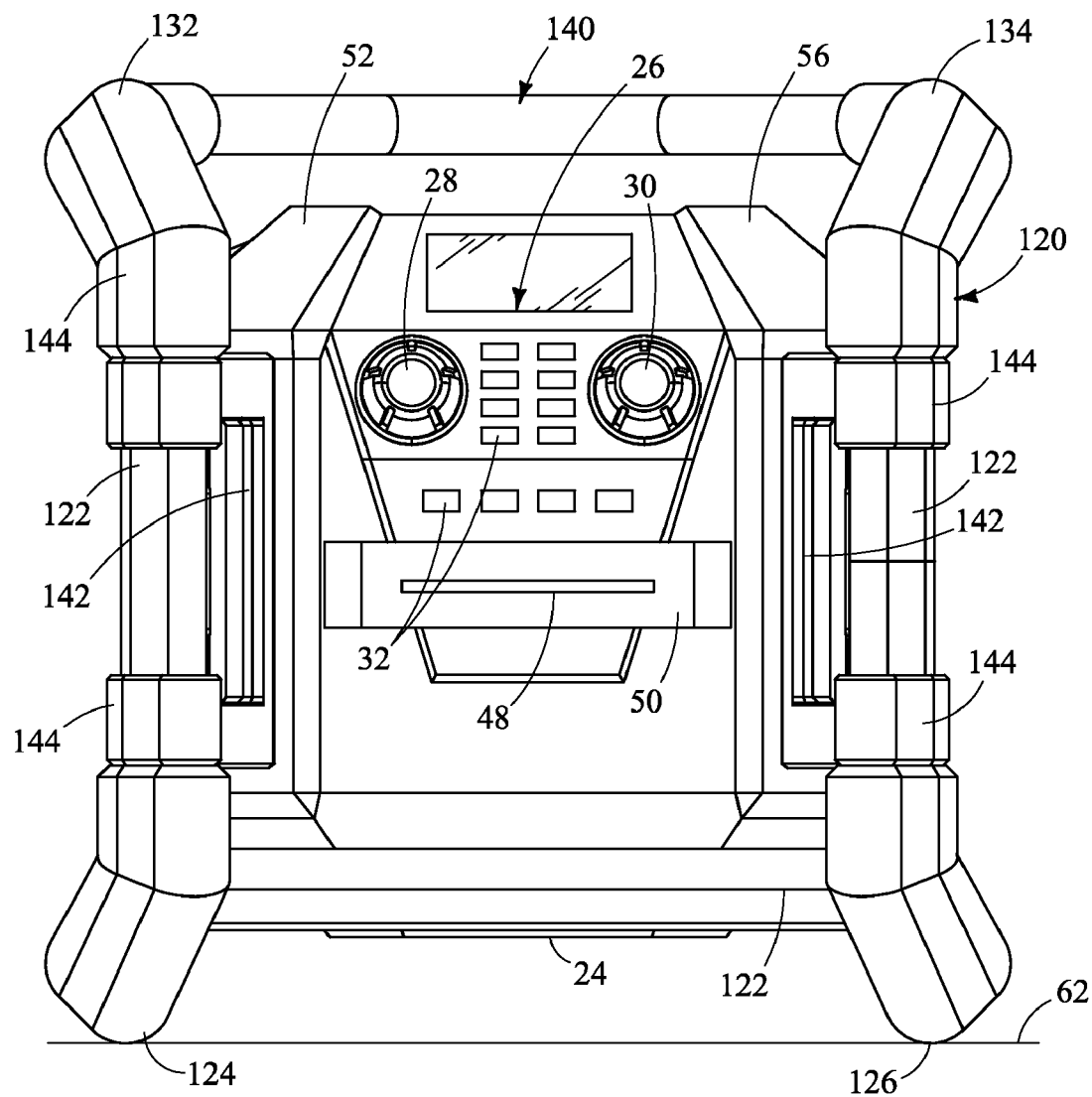
FIG. 3 is a front plan view of the embodiment shown in FIG. 1.

As is shown in FIG. 3, the unit 10 is constructed so that the bottom surface 24 is spaced from the ground or supporting surface 62 which enables the subwoofer generated low frequency sound to permeate the area. While not shown, it is preferred that the unit 10 have a remote control capability and to that end, the top of the unit has a cover 64 that is removable to reveal a chamber in which a remote control device 65 (see FIG. 9) can be stored.

Figure 7:
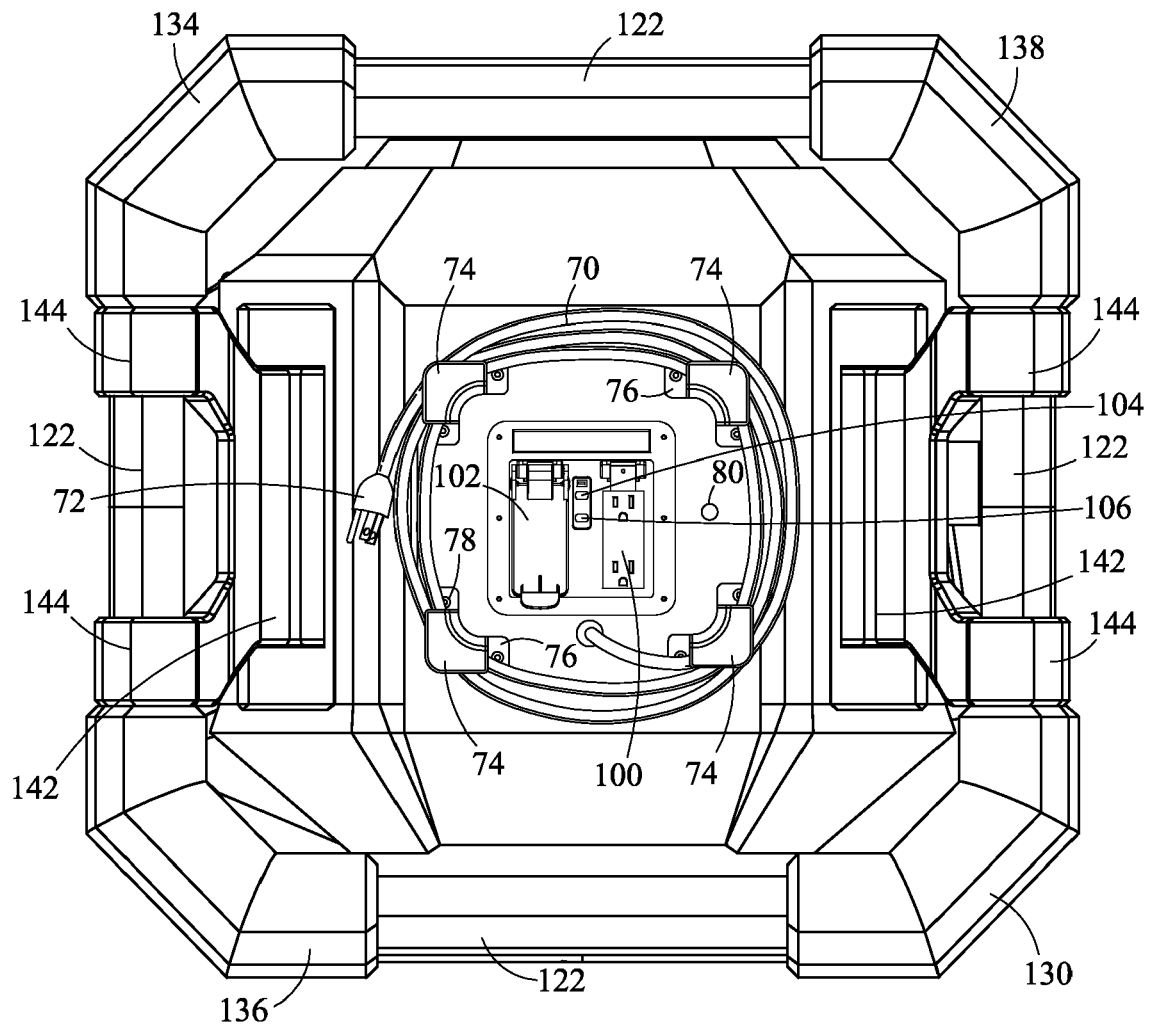
FIG. 7 is a right side plan view of the embodiment shown in FIG. 1.
Figure 8:
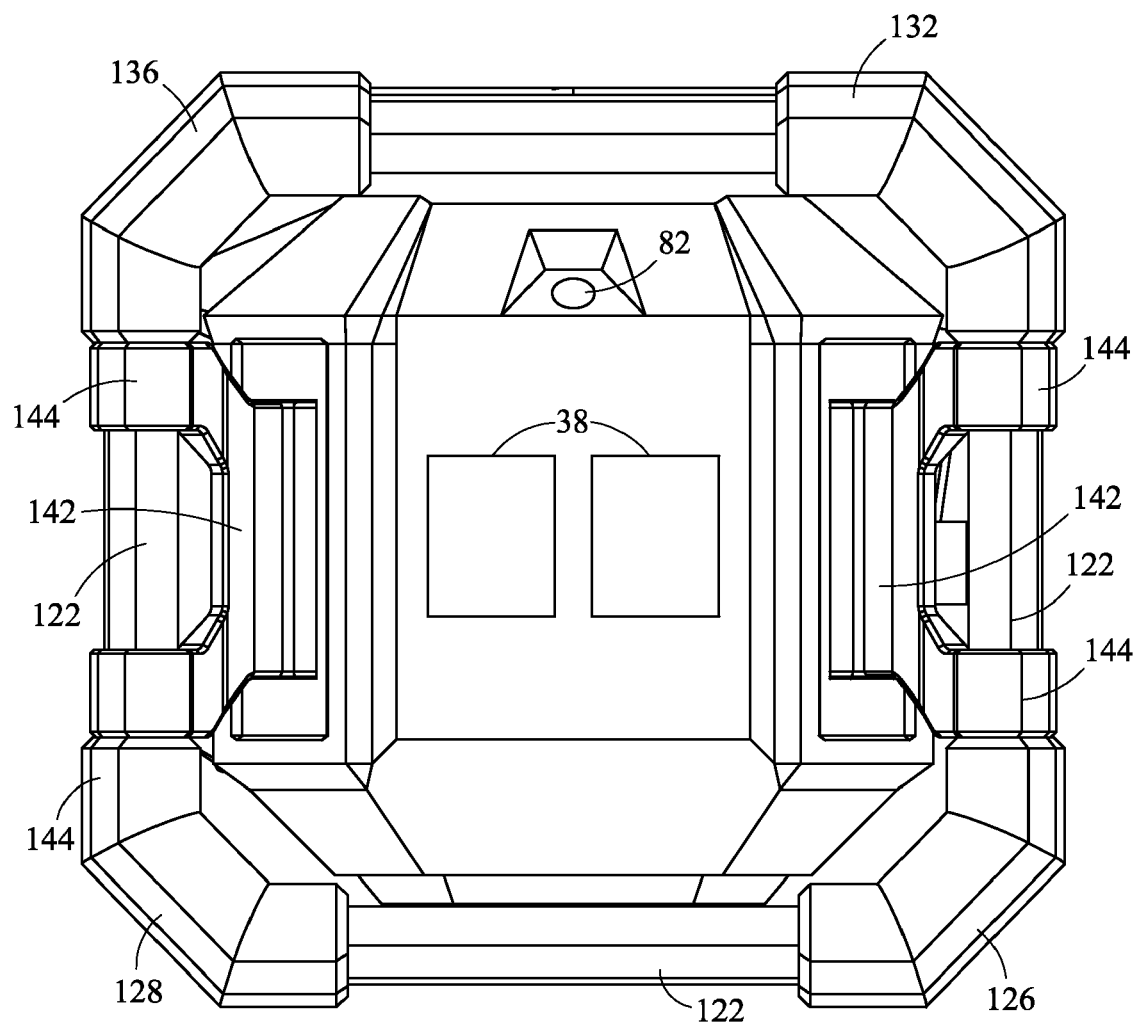
FIG. 8 is a left plan view of the embodiment shown in FIG. 1.

The unit can be connected or plugged into a source of AC power using a cord 70 having a 3-prong plug 72 as shown in FIGS. 1 and 7. The unit has a cord wrap structure comprising four outwardly extending flanges 74 that are arranged in a square around which the cord can be wrapped for storage. The flanges each have a base portion 76 for mounting to the sidewall 18 and are connected thereto by screws 78 or the like. It should also be understood that the flanges 74 may be integrally formed in the sidewall 18 if desired. A fuse 80 for the circuitry to be described is accessible on the side wall 18 and a DC receptacle or socket 82 is provided on the top of side wall 16 as shown in FIG. 2. The socket 82 is preferably protected from the elements by a removable flexible plug that is preferably made of rubber or like material which can be inserted into the receptacle opening. A representative connector 83 is shown in FIG. 9 which can be used to connect any of the previously described audio sources that can be played through the unit, which is therefore connected to the audio unit 26. Any of the previously described sources will be similarly connected to the audio unit 26 using appropriate connectors or docking unit.

The unit preferably has battery charging capability for charging both Ni-Cad battery packs and Li-Ion battery packs. This may be performed by a single charger 84 that is configured to do such charging, or two separate chargers 84 and 84a (see FIG. 9) for charging a battery pack 87 and 87a. The battery chargers are located in the housing 12 and are accessible through the door 42 shown in FIG. 4. The preferred embodiment has a pair of receptacles 94 and 94a in the compartment 40 configured to receive one of two types of battery packs 87 or 87a. Because the compartment 40 is only large enough to receive a single battery pack inserted into the compartment 40 in position to be charged at a time, the receptacles 94 and 94a can be relatively close together. In this regard, the receptacle 94 may be configured to receive a Ni-Cad battery pack 87, while the receptacle 94a is configured to receive a Li-Ion battery pack 87a. The configuration of the connectors of each type of battery pack are physically different.

A pair of duplex AC outlets 100 are also located on the right side wall 16 as shown in FIG. 7. The outlets 100 are protected by covers 102 (only one of which is shown) that are hinged at the top of the outlet pair. While they may be standard duplex receptacles, it is preferred that they be ground fault circuit interrupters to provide an extra measure of safety for the users, particularly given the fact that the unit may be subjected to harsh weather conditions. As is standard for ground fault circuit interrupters, a reset button 104 and test button 106 are provided. Due to the nature of the product, the entire unit may have GFCI protection on the main power cord 72.

As is apparent from the drawings, the unit has a frame structure, indicated generally at 120, which is shown in all of the drawings. The frame structure 120 is larger than the housing 12 in every direction and thereby provides a protective structure for the housing itself, as well as the components that are present on each of the front and side faces of the housing. The frame structure has a number of elongated rods 122 that are preferably made of hollow aluminum and have an elongated cross-sectional configuration with curved opposite end portions that merge with flat side portions. The rods 122 are of various lengths as is apparent from the drawings and all are mounted in connector fittings that are configured to receive and interconnect the rods 122. The connector fittings include lower front fittings 124 and 126, lower rear fittings 128 and 130, upper front fittings 132 and 134 and upper rear fittings 136 and 138. Each of the fittings interconnect with either two or three rods 122 so that a strong stable frame structure results. The fittings are preferably made from polypropylene or other durable plastic material. The upper fittings 132, 134, 136 and 138 also have a configuration for receiving a formed handle, indicated generally at 140 which is preferably made of polypropylene or other strong plastic or plastic-like material or aluminum.

The housing 12 is supported in the frame structure 120 by four shock absorbing bumper mounts 142 that are preferably made of rubber. The mounts 142 have spaced ends 144 that are configured with openings so that the vertical rods 122 can be inserted into them, and the other end of the mounts 142 are then connected to the housing with appropriate fasteners, such as bolts, screws or the like.

With regard to the electrical schematic of the unit embodying the present invention and referring to FIG. 9, the audio unit 26 is shown being connected to the cord 70 via fuse 80 and lines 146 and 148. A ground 150 also extends from the outlets 100 to the plug 72. Lines 146 and 148 also extend to the outlets 100 as well as to the chargers 84 and 84a, with the charger 84 having output lines 152 and 154 that extend to contacts in the receptacle 94 (see FIG. 4) into which a stem portion of a removable battery pack 87 can be inserted. Lines 146 and 148 also extend to the charger 84a, with the charger 84a having output lines 152a and 154a that extend to contacts in the receptacle 94a (see FIG. 4) into which a stem portion of a removable battery pack 87 can be inserted. Rather than a stem portion, the battery packs 87 and 87a may have a slide pack configuration. Lines 146, 148, 146a and 148a of the respective chargers 84 and 84*a* also extend to a relay 156 that is controlled by a relay coil 158 which senses whether current is flowing in the lines 146 and 148. The relay 156 is a normally closed relay which is opened when the plug 72 is connected to a source of AC power which means that the audio unit is being driven by the AC power source. When the relay is open circuited, the batteries 87 and 87*a* are completely electrically isolated from the audio unit, i.e., both positive and negative terminals are open circuited. It should be understood that the audio unit 26 may actually run on DC voltage and that the audio unit 26 may have an internal voltage converter as part of its construction.

A converter 160 may be provided to power the DC outlet 82. When the plug 72 is connected to an AC power source, the charger 84 is operational to charge the removable battery if it is placed in the receptacle 94 and the outlets 100 are available to supply power to other tools, lights or the like, as is the DC outlet 82 that is connected to the output of the converter 154.

If the plug 72 is removed from AC power, the relay 156 will be close circuited so that the removable battery will be connected to the audio unit 26 and can power the audio unit. It should be understood that the charger 84 is incapable of powering the audio unit when the relay is open circuited as shown in the drawing and is incapable of powering the audio unit 26 when AC power is not applied to the circuit inasmuch as the charger 84 does not have a resident battery or other power source other than AC power through the lines 146 and 148.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. An apparatus comprising:
   a housing having a front, two sides, a rear, a top and a bottom;
   an audio unit for producing audio signals located in said housing;
   a frame structure that is in the shape of an open faced cuboid, said frame structure being larger than said housing and being attached thereto at multiple connection points, said frame structure providing protection for said housing and suspending said housing above a supporting surface by a predetermined distance; and
   a plurality of speakers selectively connected to said audio unit, said speakers being mounted in said housing for projecting sound outwardly in a plurality of directions;
   wherein said plurality of speakers include at least three speakers that face in different directions relative to each other.

2. An apparatus as defined in claim 1 wherein said plurality of speakers comprises speakers at spaced locations around the top of said housing.

3. An apparatus as defined in claim 2 wherein said plurality of speakers comprises a speaker located near the top of the housing and near each of the interface of one of said sides with said front and rear.

4. An apparatus as defined in claim 3 wherein said housing generally has the shape of a cuboid, and said plurality of speakers comprises a speaker mounted in a space located at each of the four corners that are adjacent to said top.

5. An apparatus as defined in claim 4 wherein said space is an angled face that is oriented to direct sound upwardly and outwardly from the upper portion of said housing.

6. An apparatus as defined in claim 5 wherein said angled face is angled relative to vertical within the range of about 30 to about 45 degrees.

7. An apparatus as defined in claim 6 wherein said audio unit provides stereo signals that are connected to said speakers in a configuration whereby speakers adjacent to one another are left and right stereo speakers.

8. An apparatus as defined in claim 7 wherein said plurality of speakers further comprises a subwoofer speaker mounted in said bottom of said housing.

9. An apparatus as defined in claim 1 wherein at least some of said speakers are weatherproof speakers.

10. An apparatus as defined in claim 1 further comprises:
    a charger located in said housing for charging a removable battery pack of the type which is used to power rechargeable hand tools and other tools;
    a cord and plug for connecting said apparatus to a source of AC power
    a receptacle operably connected to said charger and being capable of receiving a removable battery pack to be charged by said charger;
    a relay connected in circuit between a battery pack located in said receptacle and said audio unit;
    a relay coil connected in circuit between said cord and said audio unit, said coil monitoring the presence of AC power being applied to said audio unit and causing said relay to open circuit and electrically isolate said audio unit from both legs of each said battery when AC power is applied to said audio unit and close circuit when AC power is not applied to said audio unit, thereby enabling said battery pack to power said audio unit when AC power is not applied thereto.

11. An apparatus as defined in claim 10 further including at least one AC power receptacle connected in said first circuit so that AC power can be provided to said receptacle when said cord and plug is connected to a source of AC power.

12. An apparatus as defined in claim 10 further including an AC to DC converter connected in said first circuit and at least one DC power receptacle connected to said converter.

13. An apparatus as defined in claim 11 further including a ground fault circuit interrupter connected in said first circuit between said at least one AC power receptacle and said cord.

14. An apparatus as defined in claim 1 wherein said audio unit comprises a radio.

15. An apparatus as defined in claim 14 wherein said audio unit further comprises a CD player.

16. An apparatus as defined in claim 1 wherein said frame structure comprises a plurality of elongated generally cylindrical frame members that are connected to one another by connector fittings at the eight corners.

17. An apparatus as defined in claim 16 wherein said housing has a top, bottom, front, rear and two side walls, and recesses located at the interface of the top and the two sides and the bottom and the two sides, an elongated cylindrical housing member located in each recess and attached to said housing at opposite ends, a plurality of linking connectors being attached to each housing member and an adjacent frame member, to thereby connect said frame structure to said housing.

18. An apparatus as defined in claim 1 wherein said audio unit has operating controls and displays located in a front of said housing.

19. An apparatus as defined in claim 11 further comprising an access door located in a rear wall for accessing a chamber that includes a receptacle for receiving a battery pack for charging by said charger.

20. An audio power unit for providing an audio output and for charging at least one removable battery pack, said unit comprising: a housing having a generally cuboid shape with front, rear, left and right sides, a top and a bottom; a charger including a receptacle located in said housing for charging said at least one removable battery pack; an audio unit for producing an audio output located in said housing; a frame structure that is in the shape of an open faced cuboid, said frame structure being larger than said housing and being attached thereto at multiple connection points, said frame structure providing protection for said housing and suspending said housing above a supporting surface by a predetermined distance; a plurality of left and right stereo speakers selectively connected to said audio unit, said speakers being mounted in said housing for projecting sound outwardly in a plurality of directions, wherein said plurality of speakers include at least three speakers that face in different directions relative to each other; a subwoofer speaker mounted in said bottom of said housing and being configured to direct sound downwardly toward a surface on which said apparatus is supported; a cord and plug for connecting said apparatus to a source of AC power: a circuit for connecting said cord to said charger and said audio unit, whereby AC power is applied to said audio unit to power the same and AC power is also applied to said charger, said circuit isolating said audio unit from both the positive and negative legs of said battery pack when AC power is applied to said audio unit and connecting said battery pack to power said audio unit when AC power is not applied to said audio unit.

21. An apparatus as defined in claim 20 wherein said space is an angled face that is oriented to direct sound upwardly and outwardly from the upper portion of said housing.

22. An audio power unit as defined in claim 20 wherein said battery charger has the capability for charging both Ni-Cad battery packs and Li-Ion battery packs.

23. An audio power unit as defined in claim 20 wherein speakers immediately adjacent to one another are the opposite of either left and right stereo speakers.

* * * * *